G. B. BRAYTON.
STEAM GENERATOR.
No. 44,601. Patented Oct. 11, 1864.
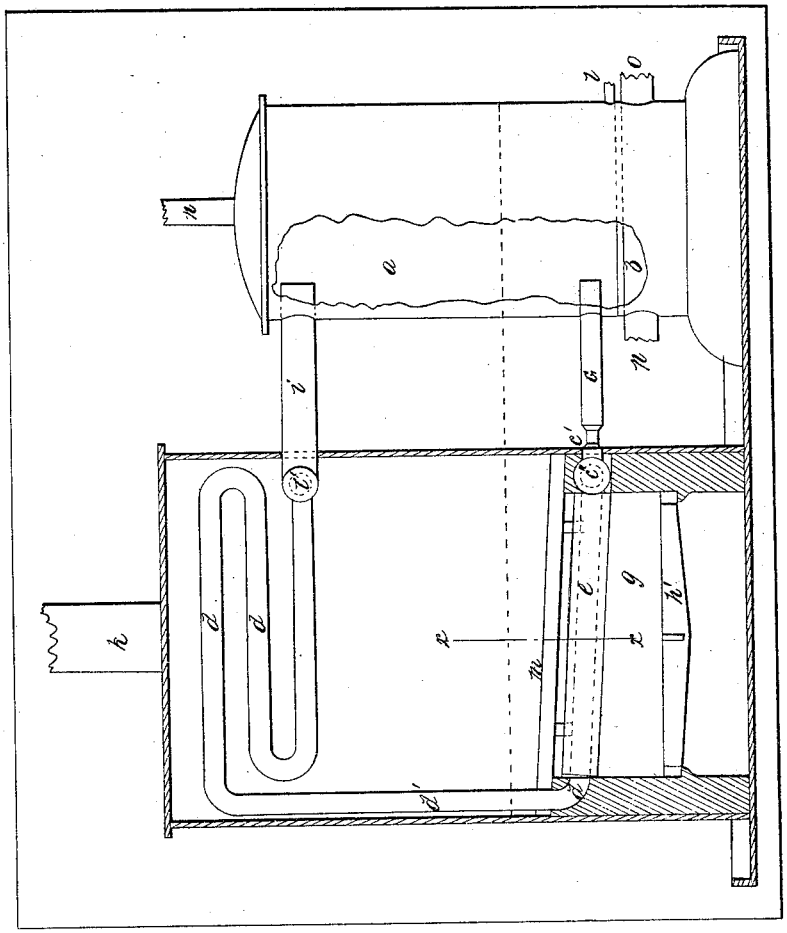
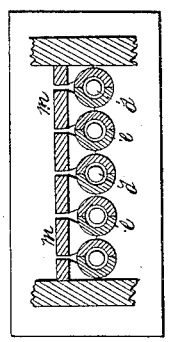
Fig. 2.
Fig. 1.
Witnesses.
A. B. Hall
Jn. L. Coombs
Inventor.
Geo. B. Brayton by
A. Pollok
his atty

UNITED STATES PATENT OFFICE.

GEORGE B. BRAYTON, OF PROVIDENCE, RHODE ISLAND.

STEAM-GENERATOR.

Specification of Letters Patent No. 44,601, dated October 11, 1864.

*To all whom it may concern:*

Be it known that I, GEORGE B. BRAYTON, of the city and county of Providence, in the State of Rhode Island, have invented certain new and useful Improvements in Steam-Generating Apparatus, which results in giving perfect safety from the dangerous and damaging effects of explosions, thus dispensing with the constant attention heretofore rendered necessary in the production of steam; economy in the consumption of fuel, and economy in construction as compared with the ordinary forms of steam generating apparatus.

These new and valuable results are obtained through a series of inventions fully described in this and other Letters Patent granted to me and bearing even date with this, each and all of which inventions may be used independently of each other, and are therefore made the subject of separate patents. Each specification is descriptive of only so much of the accompanying drawing as is necessary to understand fully the particular improvement under discussion; but the different specifications, when taken in connection, make a complete description of the whole apparatus.

The following specification has relation to one of these improvements and is termed a safety supplemental steam and water vessel in a steam generating apparatus, and the following is a full, clear and exact description of the same reference being had to the accompanying drawing.

(*a*) is a closed metallic vessel in a steam generating apparatus wholly removed from the direct action of the fire. It has but one water and one steam communication with a steam generator; at or near its top to allow steam from a generator to flow in upon the upper surface of the water it contains to maintain the same pressure in both; and at or near its bottom for water to flow to the generator. It thus can receive heat only from steam acting upon the upper surface of the water it contains. This supplemental vessel is designed for and applicable to a steam generator capable of containing but a very small quantity of water as compared with the ordinary forms of steam boilers of the same generating capacity.

The particular form of generator which I have used and believe to be the best is fully described in connection with my patent for an intercepting and transmitting medium bearing even date with this, and consists of wrought iron pipes, a portion of which containing water are placed in the flame of the fire, the whole being surrounded by brick work or iron plates lined with some non-conducting substance.

The operation of this safety supplemental steam and water vessel in a steam generating apparatus is as follows:—Water is admitted to the vessel (*a*) to any determined height by pressure from a pump, or other equivalent means, through the pipe (*l*), and then through the pipe (*c*) it flows into and finds an equal level in the generator, the bottom of which is placed below the water line of the vessel. This pipe (*c*), as shown in the drawing, is limited in size at the point (*c'*) to comply with the requirements of my patent for controlling the supply of water to and regulating the action of the same in a steam generator of a specified nature in its construction, bearing even date with this. The pipe (*c*) is connected with the vessel (*a*) at a certain distance above its bottom in order not to interfere with the proper action of my feed water heating apparatus, a full description of which will be found in my patent for the same bearing even date with this. The height to which water is to be admitted to the vessel (*a*) may be determined by any suitable means for determining the height of water to be maintained in a steam boiler; a common copper float in the vessel connected with and operating a throttle valve in a cold water pipe leading to a force pump, kept in constant operation will answer a good purpose. When steam is formed in a generator it passes into the vessel (*a*) through the pipe (*i*) above the surface of the water it contains, and water continues to flow to the generator through the pipe (*c*) as fast as water is there converted into steam, thus maintaining the same level in both. Steam may be drawn from the vessel (*a*) through the pipe (*n*) to supply an engine or for other purposes.

In the form of generator represented in the drawing, I have given the water vessels or pipes a sufficient inclination upward from the point where they receive the supply of water to the point where they join the upright vessels to cause or allow steam when generated to flow in that direction.

The object of the employment of this vessel (*a*) or the result to be obtained from its use in a steam generating apparatus of small water capacity, can be explained as follows: It is considered necessary, in order to operate with safety the ordinary forms of steam boilers, to keep a large body of water in the boiler itself, and the greater the quantity of water which can be properly held in an ordinary boiler the greater the degree of safety with which it can be operated, because any sudden lack of water is less liable to take place, and a larger time is thus given to discover any gradual diminution in the quantity of water. But in such cases the water in the boiler becomes heated to a high temperature; and if such a boiler, with steam at 100 pounds pressure to the square inch, were opened to the atmosphere, by accident or otherwise, enough steam would be given out from the water to equal in volume about eight hundred times the quantity of water to cause damage in exerting its expansive force. Now this vessel (a) holds in direct communication with the steam and water of a steam generator a body of water, which, while it is wholly removed from the direct action of the fire, still maintains to the generator, as far as relates to a sufficient supply of water, the same relation that it would if held in the generator itself with only this difference, that it is kept at an average temperature below its boiling point, thus insuring safety; for, if this vessel (a) were opened to the atmosphere by accident or otherwise with a pressure of steam at 100 pounds to the square inch, little steam would be given out by the water it contains, to cause damage by its expansive force; and as, in such a case, little steam can come from a generator, such as it is designed to use with this vessel, owing to the fact of its containing but a very limited body of water, from which steam could be developed as before explained, the whole apparatus is rendered safe. An advantage is also secured by the use of this vessel in combination with the form of generator mentioned, as we have but a small radiating surface confined entirely to the vessel (a) which not being exposed to the direct action of the fire can be effectually and permanently protected by some non-conducting substance. The vessel (a) can also be made of cast iron thus reducing the cost over that of wrought iron.

Having thus fully described my invention, what I claim and desire to secure by Letters Patent is—

The combination of a tubular steam generator with a water reservoir under the arrangement described so that the water shall be maintained therein at a temperature less than 212° Fahrenheit and be entered the generator by tending to equilibrate hydrostatic pressure between the generator and the reservoir substantially as set forth.

GEO. B. BRAYTON.

Witnesses:
 A. G. UTLEY,
 ROBERT E. NORTHAM.